July 8, 1958 R. E. DUNNIHOO 2,842,005
PULLEY UNIT
Filed Oct. 29, 1956 3 Sheets-Sheet 1

INVENTOR.
Russell E. Dunnihoo
BY Webster & Webster
ATTYS.

July 8, 1958 R. E. DUNNIHOO 2,842,005
PULLEY UNIT
Filed Oct. 29, 1956 3 Sheets—Sheet 2

INVENTOR.
Russell E. Dunnihoo
BY Webster & Webster
ATTYS.

July 8, 1958     R. E. DUNNIHOO     2,842,005
PULLEY UNIT

Filed Oct. 29, 1956     3 Sheets-Sheet 3

INVENTOR.
Russell E. Dunnihoo
BY Webster & Webster
ATTYS.

United States Patent Office 2,842,005
Patented July 8, 1958

2,842,005

PULLEY UNIT

Russell E. Dunnihoo, Lodi, Calif.

Application October 29, 1956, Serial No. 619,009

9 Claims. (Cl. 74—374)

This invention is directed to—and it is a major object to provide—a novel, versatile, selective-speed, pulley unit adapted to transmit power from a source—such as an electric motor—to a driven shaft or spindle through a range of speeds, and torques, and with a unique "torque-limiting" or automatic clutch releasing action; the pulley unit being especially designed, but not limited, for driving the spindle of a drill press or similar machine tool.

Another important object of the invention is to provide a pulley unit, for the purpose described, which includes novel, shiftable, power transmitting mechanism disposed within the confines of the pulley; such mechanism being provided with means for accomplishing shifting between different speeds and torque ranges—and between a direct drive and a geared drive—instantaneously and easily, regardless of whether the unit is running or stopped, running in either direction of rotation, or under no load or full load. The arrangement is such that the resistance to shifting is not increased with the load, and the shifting device is constructed and located so that it shifts both the speed and torque ranges simultaneously.

An additional object of the invention is to provide a pulley unit, as above, in which such power transmitting mechanism, which includes the direct-drive assembly and the reduced-speed or geared drive assembly, is arranged with novel, manually controlled, shiftable clutch means to selectively and independently place either drive assembly in operation, or both in neutral.

Still another object of this invention is to provide a pulley unit, as above, wherein said shiftable clutch means—relative to both of said driving assemblies, and regardless of the direction of rotation—is operative to automatically release upon the torque, through the assembly which is in operation, increasing to a certain amount; this being the important "torque limiting" feature of the invention. Also, the shocks of shifting—when the unit is running—are largely absorbed by such torque limiting action, and since such action takes place relatively close to the axis of the unit and the final drive shaft or spindle, inertia forces not subject to such action are at a minimum.

A further object of the invention is to provide a pulley unit which embodies—and requires—only a single-point mount whereby the pulley unit can be readily attached to a power tool or the like, as—for example—to the upper boss of a drill press.

A still further object of the invention is to provide a pulley unit, of the type described, wherein the power transmitting mechanism—including the clutch means, and as disposed within the confines of the pulley—can be arranged as a very compact structure wherein the alinement of the parts is easier to establish and maintain, and which mechanism is in the main shielded against entry of foreign substances and protected against possible damage.

It is also an object of this invention to provide a pulley unit which is designed for ease and economy of manufacture, and long use with a minimum of service, maintenance, or repair being required.

Still another object of the invention is to provide a practical, reliable, and durable pulley unit, and one which will be exceedingly effective for the purpose for which it is designed.

These objects are accomplished by means of such structure and relative arrangement of parts as will fully appear by a perusal of the following specification and claims.

Figure 1:
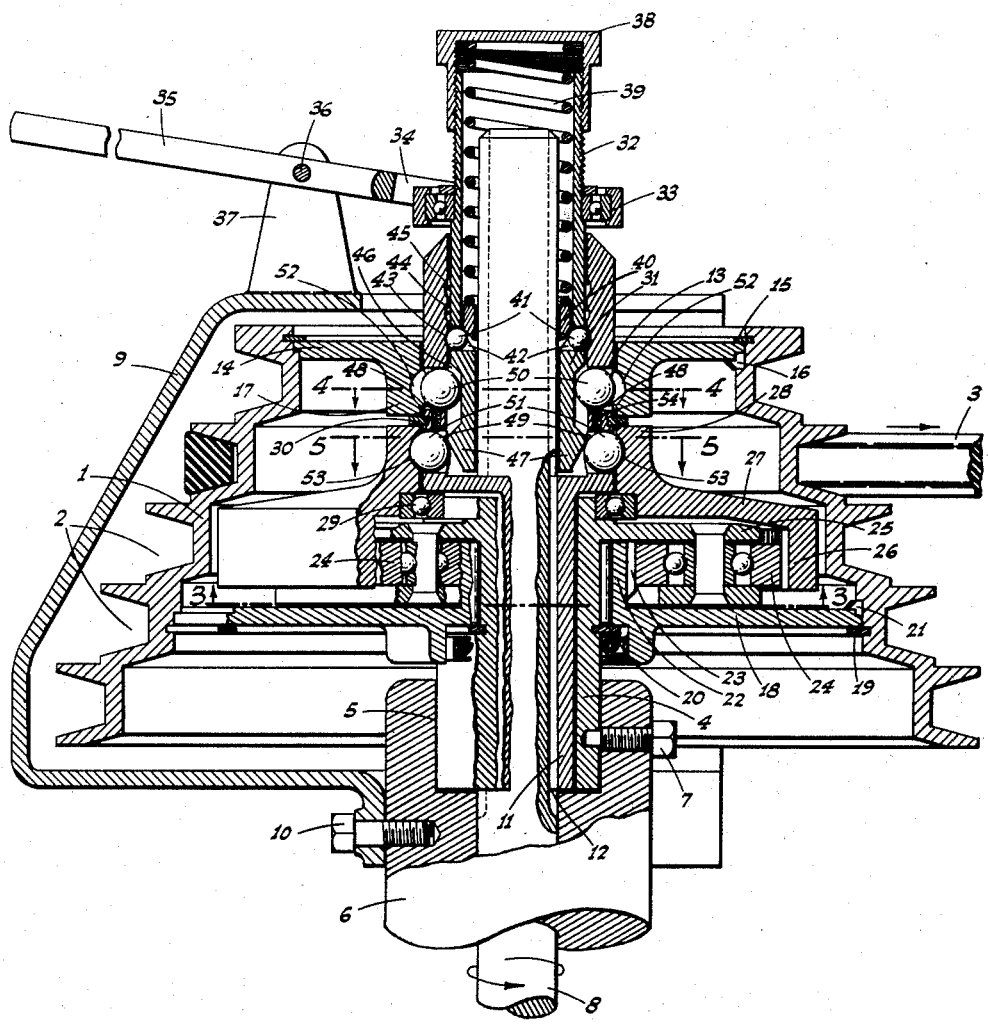
Fig. 1 is a sectional elevation of the pulley unit as in use, and with the reduced-speed drive assembly in operation.
Figure 7:
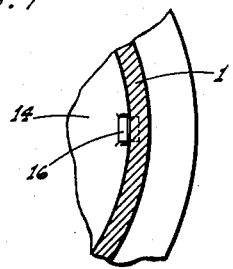
Fig. 7 is a fragmentary transverse or horizontal section taken on, and looking upwardly from, line 7—7 of Fig. 2.
Figure 2:
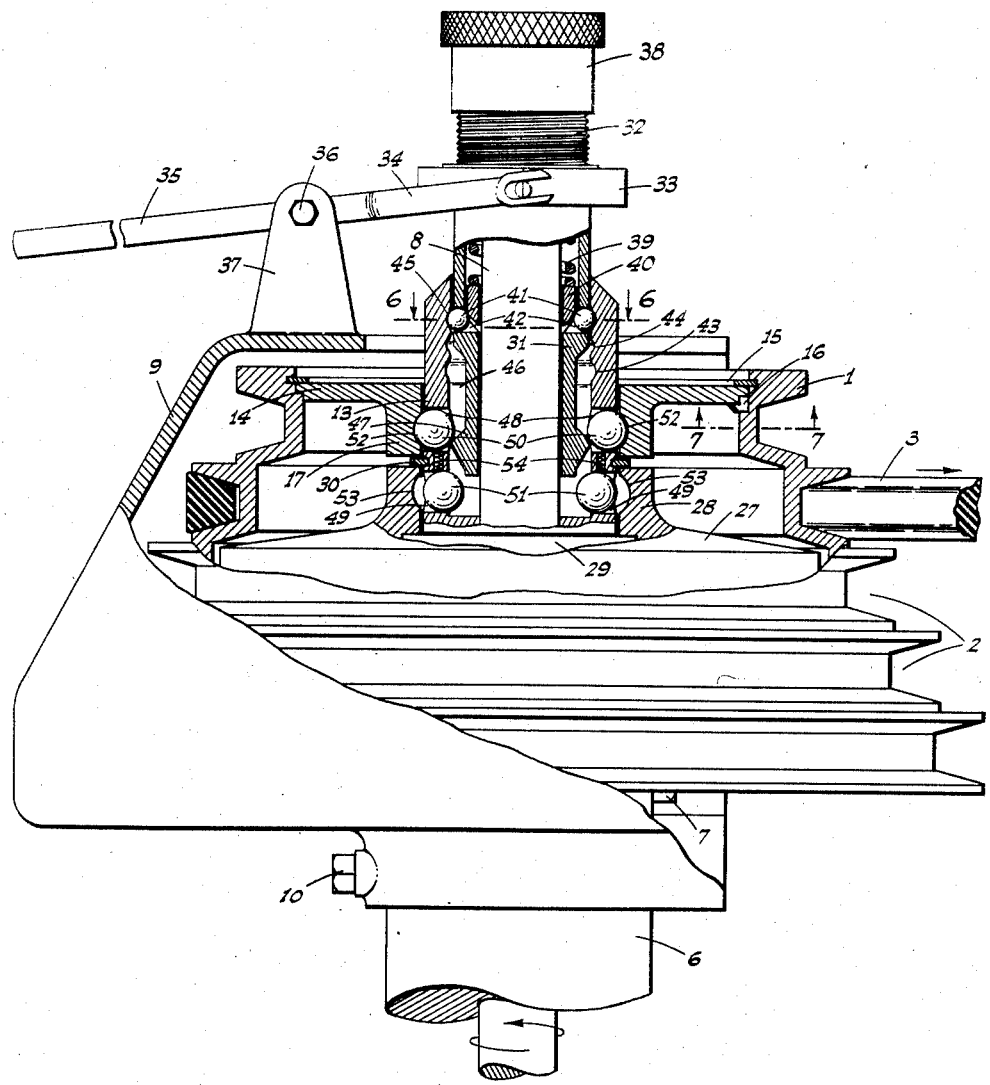
Fig. 2 is a similar view, but only partly in section, showing the direct-drive assembly in operation.
Figure 3:
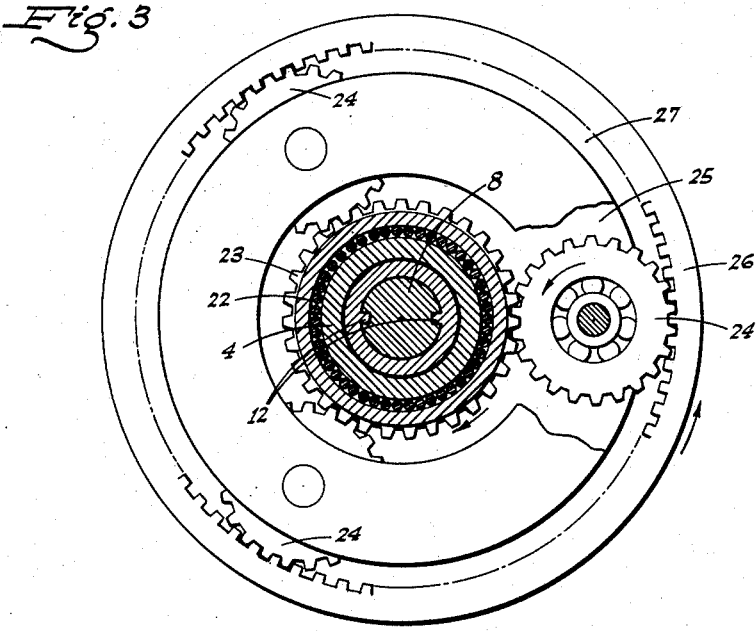
Fig. 3 is a transverse or horizontal section taken on, and looking upwardly from, line 3—3 of Fig. 1.
Figure 4:
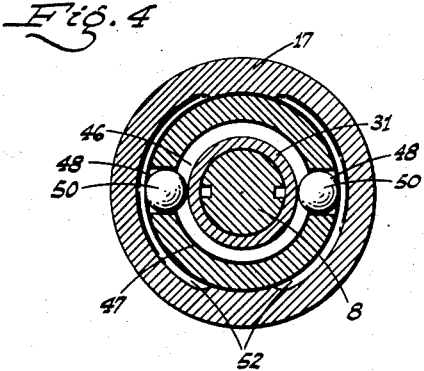
Fig. 4 is a fragmentary sectional plan view taken on line 4—4 of Fig. 1.
Figure 5:
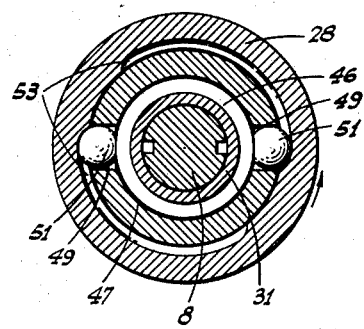
Fig. 5 is a fragmentary sectional plan view taken on line 5—5 of Fig. 1.
Figure 6:
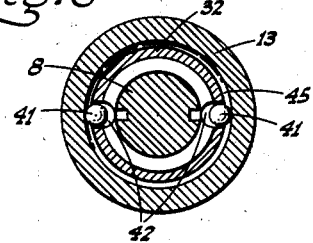
Fig. 6 is a fragmentary sectional plan view taken on line 6—6 of Fig. 2.

Referring now more particularly to the drawings, and to the characters of reference marked thereon, the novel pulley unit comprises a hollow, multiple-speed pulley 1 provided—as usual—at the periphery with a plurality of belt grooves 2 which progressively reduce in diameter axially of the pulley.

The pulley 1 is adapted to be driven by an endless V-belt 3 engaged in one of the belt grooves 2, and which belt is driven from a remote point by another but inverted multiple-speed unit on the shaft of an electric motor; such other pulley and the electric motor not being shown, but which are conventional. It is preferred that such electric motor be of reversible type for the reason which will hereinafter appear.

The pulley 1 is adapted for single point mounting, and in this connection a fixed sleeve 4 projects axially downwardly from within the pulley and engages in a socket 5 of a fixed upstanding boss 6; the sleeve 4 being held in said socket 5 by a locking cap screw 7. The boss 6 may be the upper end portion of a drill press and through which boss a driven, vertically adjustable spindle 8 rotatably projects.

As disposed mainly above the boss 6 the pulley 1 is located within a pulley shield 9 attached in rigid relation to the boss 6 by a cap screw 10. A driven sleeve 11 is disposed in fixed sleeve 4 in rotatable relation; the sleeve 11 surrounding the spindle 8 and being slidably splined in connection therewith, as at 12, whereby said spindle may move up or down while receiving rotary motion from said driven sleeve 11.

At its upper end the driven sleeve 11 merges with the lower end of a driven or rotary cylindrical cage 13 whose inside diameter is enlarged relative to that of said sleeve, whereby to initially leave a space between the outer surface of the spindle 8 and the inner surface of said cage 13.

The cage 13 forms part of a novel ball clutch arrangement which will hereinafter be described in detail.

The pulley 1 is fitted at the upper end with a circular top plate 14 held in place by means including a snap ring 15; there being a driving lug 16 between the top plate 14 and the pulley 1 to assure of positive driving engagement therebetween.

The top plate 14 is formed with an integral, depending hub 17 which surrounds the rotary cage 13 in adjacent, rotatable relation intermediate the ends of said cage.

When the hub 17 is engaged in driving relation to the cage 13, by means of the clutch mechanism hereinafter described, the pulley unit provides a direct drive from said pulley 1 to the spindle 8; such drive being through the top plate 14, hub 17, cage 13, and sleeve 11.

A reduced-speed drive of the spindle 8 from pulley 1 is accomplished as follows:

The pulley 1 is fitted—in the lower portion thereof—with a circular bottom plate 18 held in place by a snap ring 19 in the pulley 1, and another snap ring 20 on the fixed sleeve 4; there being a driving lug 21 between the pulley 1 and bottom plate 18 to assure of positive rotation of the latter from said pulley.

The bottom plate 18 is formed with a central hub 22 which surrounds the fixed sleeve 4 in rotatable relation, and such hub is formed at its periphery with a sun gear 23. The sun gear 23 is in mesh with a plurality of circumferentially spaced pinions 24 journaled in connection with a radial carrier plate 25 which extends outwardly from the upper end portion of the fixed sleeve 4; the periphery of such radial carrier plate 25 being disposed a considerable distance short of the adjacent portion of the pulley 1.

An internal ring gear 26 surrounds and runs in mesh with the pinions 24, and such ring gear 26 is formed integral with—and depends from the periphery of—a radial flange 27 which extends outwardly from an upstanding hub 28 journaled in connection with the upper end of the fixed sleeve 4 by means including a bearing 29. The upstanding hub 28 extends in adjacent, rotatable relation about the cage 13 directly below the hub 17; there being a snap ring 30 on said cage between such hubs.

It will be recognized that when the upstanding hub 28 is coupled in driving relation to the cage 13, by means of the clutch mechanism hereinafter described, a relatively slow-speed drive is imparted to the spindle 8 from the pulley 1, and in a direction opposite to that of the direct drive; the line of such low speed drive being from pulley 1 through bottom plate 18, sun gear 23, pinions 24, internal ring gear 26, through flange 27 to hub 28, and from the latter to the sleeve 11.

With the described power transmitting mechanism within the pulley 1, a direct drive or a reduced-speed drive is accomplished by merely clutching hub 17 to cage 13, or by clutching hub 28 to said cage, selectively and independently, and this is accomplished by means of the following arrangement:

A shifting collar 31 is disposed in the cage 13 in axially slidable relation between said cage and the upper end portion of the spindle 8; such collar being adapted to be so shifted by means of a shifting sleeve 32 which extends integrally from the upper end of said collar upwardly through the cage 13 and to a termination a substantial distance thereabove.

The shifting sleeve 32 is fitted—above the cage 13—with a bearing mounted shifting collar 33 engaged, on opposite sides, by a shifting fork 34 on the inner end of a hand lever 35 pivoted, as at 36, in connection with a bracket 37 fixed on, and upstanding from, the top of the pulley shield 9.

The shifting sleeve 32 is provided, at its upper end, with a screw cap 38, and a helical compression spring 39 is disposed in said sleeve 32 between the cap 38 and a slidable, end-tapered thrust ring 40 which rides in contact with opposed ball detents 41 in ball ports 42 in the sleeve 32 immediately above the collar 31.

The ring 40—under the influence of the spring 39—urges the ball detents 41 outwardly for engagement, selectively, in any one of three vertically spaced annular grooves 43, 44, and 45 formed in the inner wall or surface of the cage 13 adjacent the upper end thereof.

By shifting the sleeve 32 up or down, by manipulation of the hand lever 35, the ball detents 41 are engaged in one of the grooves 43, 44, or 45, to then hold the sleeve 32, and consequently the collar 31, in a selected position of axial adjustment.

The shifting collar 31 is formed, intermediate its ends, with an annular channel 46 which is relatively wide in an axial direction, and below such channel the lower end portion of collar 31 defines an annular, radially outwardly projecting cam 47 tapered top and bottom.

In radial alinement with the hubs 17 and 28 the cage 13 is formed with opposed ball ports 48 and 49, respectively; balls 50 being engaged in the ports 48, while balls 51 are engaged in the ports 49.

The depending hub 17 is formed, on its inner periphery, with circumferentially spaced, part-circle grooves 52 in the radial plane of the ports 48, while the upstanding hub 28 is formed, on its inner periphery, with similar grooves 53 in the radial plane of the ports 49.

When the shifting sleeve 32 is disposed with the ball detents 41 in the intermediate groove 44, the annular cam 47 lies between the upper balls 50 and the lower balls 51, so that neither set of said balls are then urged outwardly by said cam. As a consequence, the pulley unit is in a neutral position, without any drive being imparted from the pulley 1 to the spindle 8.

Upon shifting of the sleeve 32 upwardly until the ball detents 41 rest in the annular groove 45, the tapered top of cam 47 engages the upper balls 50 slightly below dead-center and urges them radially outwardly so that they fall into the grooves 52 in the hub 17, thus effectively clutching said hub into direct driving engagement with the cage 13.

On the other hand, with lowering of the shifting sleeve 32 from the neutral position to a position with the ball detents 41 in the annular groove 43, the tapered bottom of cam 47 engages the lower ball 51 slightly above dead-center and urges them outwardly into the grooves 53 of the hub 28, whereby to place the latter in driving engagement with said cage 13, and which of course is the reduced-speed drive.

When the balls 50 or 51 are thus engaged, the ones not engaged are held in their radially inwardly disposed or inoperative position by springs 54.

Whether the pulley unit is in operation through the direct-drive assembly or the reduced-speed drive assembly, an increase in torque beyond a certain limit will result in an automatic release of the related clutching means; i. e., the balls 50 or 51, respectively. This is due to the fact that when such torque limit is reached the balls 50—bearing against the tapered top of the cam 47, or the balls 51 bearing against the tapered bottom of said cam (as the case may be)—cause said cam, and the collar 31, to shift to the intermediate or neutral position and so that said balls escape from the related grooves in the corresponding hub. The torque required to release the clutch means, as above, is determined by adjusting the load of spring 39 on thrust ring 40; such adjustment being accomplished by manually rotating screw cap 38, and which can be done whether the pulley unit is running or stopped. One of the primary advantages of the torque limiting feature is that it effectively prevents damage to the pulley unit, or the tool or machine which it is driving.

With the described pulley unit, a relatively slow or reduced-speed drive in one direction, and a relatively fast, direct drive in the other direction can be accomplished; this being advantageous—for example—for running in a tap at low speed, while retracting it at high speed.

It is also to be recognized that in addition to the speed-changing mechanism within the pulley, further speed changes can be effected by selective disposition of the belt 3 in the belt grooves 2.

By providing the drive and change-speed mechanism within the confines of the pulley 1, not only is there the advantage of compactness and protection against damage, but additionally a smooth and advantageous power flow from the pulley 1 to the spindle 8 is accomplished because of the concentric and adjacent relation of all of the parts to the axis of the assembly.

Further, there is little adverse inertia on the described ball clutch mechanism, as it too lies very close to the spindle or pulley axis.

Also, when the pulley unit is shifted to place the reduced-speed or geared drive in operation, the path of power from the pulley through the gears and related clutch mechanism to the spindle 8 is such that it allows the increased torque to be borne by said gears, with the reaction on the single but sturdy mounting sleeve 4.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A change-speed pulley unit, adapted to drive a spindle projecting from a stationary part, comprising a hollow pulley concentric to the spindle, a rotary sleeve surrounding the spindle for a portion of its length in driving relation, a fixed sleeve attached to the stationary part and surrounding the rotary sleeve, the sleeves extending axially into the pulley, the latter being rotatably supported from the fixed sleeve, a cylindrical member formed coaxially on the rotary sleeve within the pulley and clear of the fixed sleeve, a pair of separate hubs surrounding the cylindrical member, direct-driving means connecting the pulley to one hub, speed reduction means connecting the pulley to the other hub, and clutch means operative to selectively and independently couple said hubs to said cylindrical member.

2. A change-speed pulley unit, adapted to drive a spindle projecting from a stationary part, comprising a hollow pulley concentric to the spindle, a rotary sleeve surrounding the spindle for a portion of its length in driving relation, a fixed sleeve attached to the stationary part and surrounding the rotary sleeve, the sleeves extending axially into the pulley, the latter being rotatably supported from the fixed sleeve, a cylindrical member formed coaxially on the rotary sleeve within the pulley and clear of the fixed sleeve, a pair of separate hubs surrounding the cylindrical member, a rigid connection between the pulley and one hub, speed reduction means connecting the pulley to the other hub and comprising a circular plate rotatable about and radiating from the fixed sleeve to connection with the pulley, a sun gear formed on said plate, an internal ring gear surrounding the sun gear in spaced relation, pinions in mesh between the sun gear and ring gears, a pinion carrier rigid with and radiating from the fixed sleeve, and a radial flange connecting the ring gear and the other hub; and clutch means operative to selectively and independently couple said hubs to said cylindrical member.

3. A change-speed pulley unit, adapted to drive a spindle projecting from a stationary part, comprising a hollow pulley concentric to the spindle, a rotary sleeve surrounding the spindle for a portion of its length in driving relation, a fixed sleeve attached to the stationary part and surrounding the rotary sleeve, the sleeves extending axially into the pulley, the latter being rotatably supported from the fixed sleeve, a cylindrical member formed coaxially on the rotary sleeve within the pulley and clear of the fixed sleeve, a pair of separate hubs surrounding the cylindrical member, direct driving means connecting the pulley to one hub, speed reduction means connecting the pulley to the other hub, ball clutches arranged with said cylindrical member and adapted to selectively and independently couple the hubs thereto, an axially shiftable clutch actuating collar in the cylindrical member, a shifting sleeve rigid with the collar and extending out of the cylindrical member to a point beyond the adjacent end of the pulley, and manually operative means mounted outside the pulley and engaged with the extended portion of said last named sleeve whereby to shift the latter.

4. A change-speed pulley unit, adapted to drive a spindle projecting from a stationary part, comprising a hollow pulley concentric to the spindle, a rotary sleeve surrounding the spindle for a portion of its length in driving relation, a fixed sleeve attached to the stationary part and surrounding the rotary sleeve, the sleeves extending axially into the pulley, the latter being rotatably supported from the fixed sleeve, a cylindrical member formed coaxially on the rotary sleeve within the pulley and clear of the fixed sleeve, a pair of separate hubs surrounding the cylindrical member, direct driving means connecting the pulley to one hub, speed reduction means connecting the pulley to the other hub, said cylindrical member being a cage having ball ports therethrough in the zones of the hubs, balls in said ports normally clear of the hubs, the latter having part-circle circumferential grooves in their inner faces disposed to register with corresponding ball ports, and shifting means separate from the spindle operative from exteriorly of the pulley adapted to cause the related balls to move partially out of the ports and to engage in clutching relation in the grooves of one hub or the other, selectively and independently.

5. A change-speed pulley, as in claim 4, in which said shifting means includes an axially movable shifting collar in the cage, the collar including an annular cam thereon adapted to engage and so move the balls in the ports corresponding to one hub or the other upon shifting of said collar to one position or another, and a shifting sleeve connected to said collar and extending out of the cage and the adjacent end of the pulley.

6. A change-speed pulley unit, adapted to drive a spindle projecting from a stationary part, comprising a hollow pulley concentric to the spindle, a rotary sleeve surrounding the spindle for a portion of its length in driving relation, a fixed sleeve attached to the stationary part and surrounding the rotary sleeve, the sleeves extending axially into the pulley, the latter being rotatably supported from the fixed sleeve, and shiftable power transmitting mechanism in the pulley between the latter and said rotary sleeve; said mechanism including a cylindrical member on the rotary sleeve, a pair of separate hubs surrounding the cylindrical member, means direct-driving one hub from the pulley, means driving the other hub from the pulley at reduced speed, and clutch means adapted to couple one hub or the other to the cylindrical member, selectively and independently.

7. A change-speed pulley unit, adapted to drive a spindle projecting from a stationary part, comprising a hollow pulley concentric to the spindle, a rotary sleeve surrounding the spindle for a portion of its length in driving relation, a fixed sleeve attached to the stationary part and surrounding the rotary sleeve, the sleeves extending axially into the pulley, the latter being rotatably supported from the fixed sleeve, and shiftable power transmitting mechanism in the pulley between the latter and said rotary sleeve; said mechanism including axially spaced first and second circular plates in and driven by the pulley, a cylindrical member on the rotary sleeve clear of the fixed sleeve, a pair of separate hubs surrounding the cylindrical member, one hub being on the first plate, a speed-reducing gear train connected between the second plate and the other hub, and clutch means adapted to couple one hub or the other to the cylindrical member, selectively and independently.

8. A change-speed pulley unit, adapted to drive a spindle projecting from a stationary part, comprising a hollow pulley concentric to the spindle, a rotary sleeve surrounding the spindle for a portion of its length in driving relation, a fixed sleeve attached to the stationary part and surrounding the rotary sleeves, the sleeves extending axially into the pulley, the latter being rotatably supported from the fixed sleeve, a cylindrical member formed coaxially on the rotary sleeve within the pulley and clear of the fixed sleeve, a pair of separate hubs surrounding the cylindrical member, direct driving means connecting the pulley to one hub, speed reduction means connecting the pulley to the other hub, said cylindrical member being a cage having ball ports therethrough in the zones of the hubs, balls in said ports normally clear of the hubs, the latter having part-circle circumferential grooves in their inner faces disposed to register with corresponding ball ports, and shifting means operative from exteriorly of the pulley adapted to cause the related balls to move partially out of the ports and to engage in clutching relation in the grooves of one hub or the other, selectively and independently; said shifting means including an axially movable shifting collar in the cage, the collar having an annular cam thereon adapted to engage and move the balls in the ports corresponding to one hub or the other upon shifting of said collar to one position or the other, the ball engaging portions of the cam being tapered in a manner and contacting the balls at other than dead-center whereby, in response to a torque limit, the engaged balls urge said collar from said one position or the other to a third and neutral position.

9. A unit, as in claim 8, with springs acting on the balls to yieldably retain the same in an inoperative position.

References Cited in the file of this patent

UNITED STATES PATENTS

| | | |
|---|---|---|
| 958,632 | Griffin | May 17, 1910 |
| 1,708,183 | Levedahl | Apr. 9, 1929 |
| 2,313,708 | Waller | Mar. 9, 1943 |
| 2,399,451 | Rothacker | Apr. 30, 1946 |
| 2,695,637 | Ocenasek | Nov. 30, 1954 |